June 28, 1938.   E. L. BARRETT   2,121,852
ELECTRIC MOTOR
Filed Dec. 24, 1937
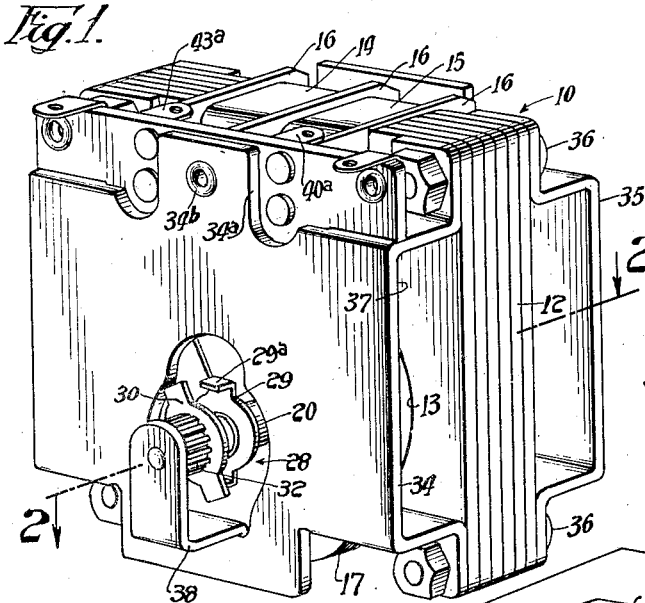
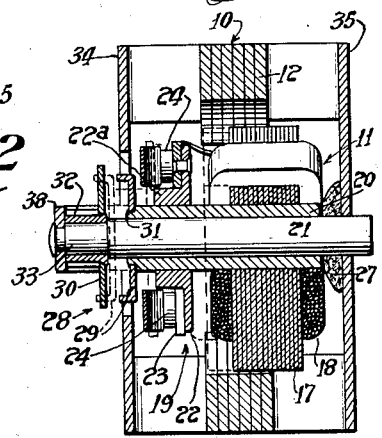
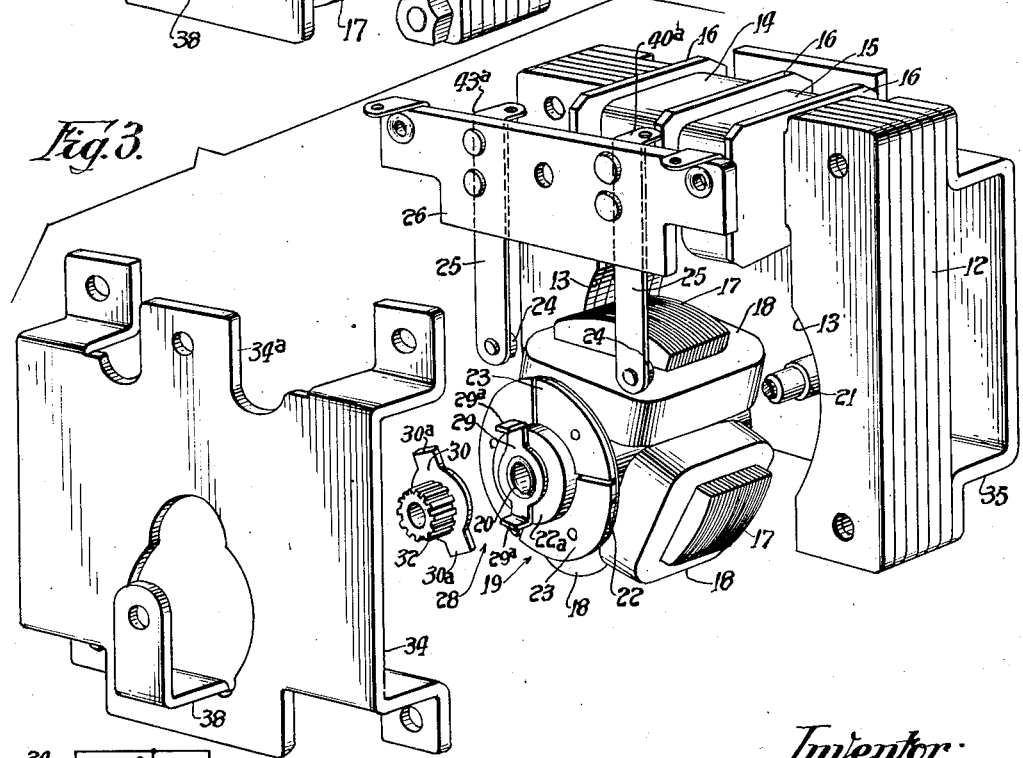
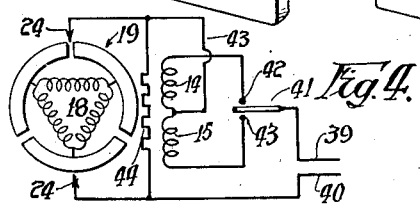
Inventor:
Edward L. Barrett,
By Parker, Carlson, Pitzner & Hubbard
Attorneys.

Patented June 28, 1938

2,121,852

UNITED STATES PATENT OFFICE 2,121,852

ELECTRIC MOTOR

Edward L. Barrett, La Grange, Ill., assignor to Utah Radio Products Company, Chicago, Ill., a corporation of Illinois Application December 24, 1937, Serial No. 181,536

12 Claims. (Cl. 172—36)

The invention relates to small electric motors and more particularly to such motors of the commutator type.

Although motors embodying the present invention find utility in a large number of other fields, as for example, in valve actuating mechanisms and toys, they have particular utility, however, as the prime movers for the tuning instrumentalities of radio receiving sets and especially such receiving sets designed for use in automobile installations. In such automobile installations, the electric motor must be capable of effective operation when mounted in any one of a large variety of positions because the cramped space requirements in an automobile often preclude the possibility of mounting the radio set in any particular plane or position. Furthermore, the motor must be capable of exerting a predetermined minimum torque even when the supply voltage varies through a wide range, as it frequently does in an automobile installation, where the motor is supplied with current from the conventional automobile storage battery. The motor herein disclosed is intended to meet these diverse difficulties of environment.

The general object of the present invention is to provide an improved form of small motor which is not only compact in form and efficient in operation but also rugged in construction and economical to manufacture.

Another object of the invention is to provide a small commutator-type motor embodying an improved form of axially movable rotor arranged to control an associated releasable clutch mechanism or the like.

A more specific object of the invention is to provide a small commutator-type electric motor embodying a releasable clutch or the like controlled by axial movement of the motor rotor and cooperating brush tensioning mechanism arranged to effect the dual function of not only maintaining the brushes in operative engagement with the commutator but also to urge the rotor axially to an idle position laterally offset from the cooperating stator, the rotor being pulled axially from this idle position by magnetic attraction between it and the stator when the motor is in operation.

A further object of the invention is to provide an improved electric motor embodying widely spaced salient poles on the rotor and an associated clutch mechanism which prevents the imposition of load on the rotor at the instant of starting so that the motor will start properly even if it is at rest in a position in which the salient poles cause a poor starting torque.

Another object of the invention is to provide an improved electric motor embodying an axially movable rotor arranged to actuate a clutch in which the rotor will always be moved to clutch-engaging position upon energization of the motor even when it is running at no-load. This is preferably accomplished by providing a resistor in shunt with the armature winding so as to insure at least a predetermined minimum current through an associated series field winding, this excitation of the series field winding being utilized to pull the rotor into its clutch-engaging position.

Still another object of the invention is to provide in a motor of the type set forth an improved form of mounting for the rotor and associated commutator elements of such character that these elements are supported for effective rotational and limited axial movement even when the motor is mounted in a wide variety of different angular positions.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing in which:

Figure 1 is a perspective view of an electric motor embodying the invention;

Fig. 2 is a horizontal transverse sectional view along the line 2—2 of Fig. 1;

Fig. 3 is an exploded perspective view of the motor of Fig. 1; and

Fig. 4 is a wiring diagram of the motor of Fig. 1.

For purposes of illustration of its various novel features, the invention has been shown herein as embodied in a reversible, two-pole, commutator type, universal motor. By the term "universal" motor, it will, of course, be understood that reference is had to the fact that the motor may be operated from either a direct current or alternating current source of supply. The invention is, however, applicable in its broader aspects to various kinds of motors whether they be designed particularly for use with alternating current or with direct current. In general, the principal elements of the motor shown in the drawing are a stator or field member designated generally by the numeral 10 and a rotor or armature 11.

The stator or field member 10 has been shown herein as including a generally U-shaped core 12 presenting flat end faces and made up of laminations of a suitably magnetizable metal such as silicon steel. The depending legs of the core 12 are cut away arcuately as indicated at 13 (Fig. 3) in order to form a rotor recess embracing the rotor 11. It will thus be seen that the two legs of the core comprise two diametrically opposed stator or field pole pieces. These pole pieces are energized by one or the other of two alternatively available field windings 14 and 15 encircling the horizontal arm or leg of the core. These field windings are wound in opposite directions in order that the motor may be energized for rotation in one direction or the other by the selective excitation of the corresponding one of these windings. Suitable insulating spacers 16 separate the windings and constitute spool ends to facilitate the winding of the same on the core.

The rotor or armature member 11 has been shown as being of the salient pole type with three equally spaced pole piece projections 17 made of laminations of suitably magnetizable steel or iron. Each of these pole projections is surrounded by an individual energizing winding 18, to which current is supplied through a commutator designated generally by the numeral 19.

As a means of supporting the rotor 11 for limited endwise movement as well as rotational movement, the rotor has been shown herein as carried by a sleeve 20 (Fig. 2) telescoped on a fixed shaft 21. As is hereinafter explained in greater detail, endwise or axial movement of the rotor 11 is utilized to control an associated clutch mechanism in response to energization and deenergization of the motor. The use of the sleeve-and-shaft type of mounting disclosed is advantageous not only from the standpoint of simplicity of manufacture, but also because of the facility with which the motor may be mounted in a variety of different angular positions when in use without danger of jamming the rotor bearings or unduly increasing the friction therein. As to simplicity of manufacture, the use of a sleeve journalled on a fixed shaft to carry a rotor obviates the necessity of alining separate end bearings by a hand reaming operation or the like. Similarly, during the operation of the motor the long sleeve bearing supports the rotor for free endwise and rotational movement without material change in frictional resistance irrespective of the position in which the motor may be mounted. This latter consideration is particularly important in automobile installations of radio receiving sets in which the motor may be utilized to drive the tuning instrumentality of the set. In such installations, the limited space requirements often require mounting of the radio set and its associated parts in a variety of different angular positions, and in addition, the tilting motions of the vehicle also necessitate functioning of the radio set appurtenances in a large variety of positions.

In accordance with one aspect of the present invention, the brush tensioning mechanism co-operating with the commutator 19 is utilized to perform the dual function of not only maintaining the brushes in operative engagement with the commutator but also for yieldably urging the rotor 11 to a normal idle position axially offset with respect to the stator 12. With such an arrangement, the rotor is pulled axially into alinement with the stator by the magnetic attraction between the parts when the motor is energized and as soon as the motor is deenergized the rotor is again shifted to its offset position by the brush tensioning mechanism. As a result, this automatic axial movement of the rotor, in response to energization and deenergization of the motor, may be conveniently utilized for actuating an associated clutch mechanism or the like. In the particular construction herein illustrated, the commutator 19 has been shown in the form of a disk of insulating material 22 (Figs. 2 and 3), having a hub 22ª fast on the sleeve 20, and carrying a plurality of spaced electrically conductive segments 23 in spaced insulated relation on its outer end face. Three such segments are provided in the commutator shown for the corresponding three energizing windings 18 on the rotor. The cooperating brushes 24, which bear against the commutator segments 23, are illustrated in the form of disk-shaped contact points.

The brush tensioning mechanism for the brushes or contacts 24 has been shown herein as including two flat cantilever type metal spring fingers 25 supported by a stationary insulating bridge 26. These spring fingers 25 exert a sufficient pressure on the commutator, in a direction generally axial with respect to the rotor 11, to urge the rotor laterally to the offset position shown in full lines in Fig. 2. Movement of the rotor 11 axially into the alined or operative position, shown in dotted lines in Fig. 2, is effected by magnetic attraction between the rotor and stator when the motor is energized. The spring fingers 25 are fashioned to exert a sufficiently small pressure as to permit this automatic endwise movement of the rotor. In the two pole motor shown, the brushes 24 are preferably arranged to contact the commutator along the center line of the stator pole pieces in order to facilitate operation of the motor in either direction of rotation. In addition, the pressure applied to the rotor and commutator by the spring fingers 25 is preferably applied at symmetrically spaced points along a transverse axis of the shaft 21 so that there will be no tendency to skew the sleeve 20 on its supporting shaft, and as a result, the friction between the sleeve and shaft is minimized. Upon reference to Fig. 2, it will be seen that a disk-shaped oil retaining cushion of yieldable material 27 is disposed at the inner end of the sleeve 20 thereby preventing chattering of the sleeve against the adjacent end-bell and otherwise minimizing the noise of operation of the motor.

In radio receiving set installations, for example, electric motors of the type herein disclosed may be utilized to rotate the variable condenser or other tuning instrumentalities of the set to various selected tuning positions. For this purpose a suitable automatic switching mechanism may be utilized to deenergize the motor when the radio set tuning instrumentality reaches a certain selected position. In such case it is, however, desirable that the motor should be immediately disconnected from the tuning instrumentality so that there will be no overrunning of the latter as the motor coasts to a stop. In motors of the type herein contemplated, this automatic disengagement from the load may be conveniently effected by a clutch mechanism actuated in response to the axial movement of the rotor 11 upon energization and deenergization of the motor. Thus, in the particular construction illustrated, a clutch mechanism designated generally by the numeral 28 (Figs. 2 and 3) is actuated by the axially movable rotor 11. The clutch mechanism is also advantageous in a motor having a salient pole rotor, like that shown herein, since the rotor has a widely varying starting torque depending upon its position at starting, and the clutch permits the rotor to gain momentum before the load is applied. Hence it is sometimes desirable to use this clutch arrangement in the motor shown even though other means is provided for insuring precision of stoppage of the load.

The clutch mechanism 28 has been shown as including a first rotatable clutch member 29 movable bodily with the rotor 11 and a second cooperating rotatable clutch member 30. The clutch member 29 has been shown as including two L-shaped ears 29ª engageable with complemental projections 30ª on the second clutch member 30. Both of the clutch members 29 and 30 may be economically fashioned as stampings from sheet metal. The first clutch member 29 is fast on the rotor sleeve 20 being positioned on a shoulder on the end of the sleeve which is of reduced diameter and with the end 31 of the sleeve peened over to engage the clutch member (Fig. 2). The second clutch member is similarly made fast to a pinion 32 which is loosely journalled on the reduced outer end portion 33 of the shaft 21. The shoulder at the inner end of the reduced portion 33 on the shaft prevents inward movement of the pinion 32 and the attached clutch member 30. It will thus be seen that when the rotor 11 is moved axially to the left (as viewed in Fig. 2) upon energization of the motor, that the first clutch member 29 will be moved from the full line position shown to the dotted line position in Fig. 2, thereby engaging the second clutch member 30, and connecting the pinion 32 in driven relation with the rotor. This pinion may, of course, be connected to a radio receiving set tuning instrumentality or other load through the medium of a suitable gear train or the like (not shown).

Support is afforded the fixed shaft 21 by a pair of generally channel shaped end-bells or end-shields 34 and 35 secured to the opposite flat end faces of the stator core 12 by through-bolts 26. The channel or recessed shape of the end-shields gives ample space for the axially movable rotor and associated commutator. It will be understood that these end-bells may be fashioned as stampings from sheet metal and may, if desired, form a complete enclosure for the opposite faces of the motor. As shown in Fig. 1, the insulating bridge 26 rests on the top of the end-shield 35 and is secured to a projection 34ª thereon by an eyelet 36. This insulating bridge, which supports the brush tensioning fingers 25, is also utilized as the terminal board for the motor. Access to the brush tensioning fingers 25 for the purposes of adjustment may be readily had from the side of the motor through the space 37 (Fig. 1) between the end shield 35 and core 12.

In order that the pinion 32 may be exposed for meshing engagement with a cooperating driven gear or the like, this pinion is preferably supported in a position laterally offset with respect to the outer face of the adjacent end-shield 35 (Fig. 1). For this purpose an L-shaped bracket 38 is struck out from the face of the end-shield and supports the adjacent end of the fixed shaft 21. The pinion 32 is located between the plane of the outer face of the end-shield 34 and the bracket 38, thereby exposing a major portion of the periphery of the pinion for engagement with a gear or rack.

In the operation of the motor herein disclosed, current may be supplied thereto from a suitable source (not shown) as for example, the conventional storage battery of an automobile, through conductors 39—40 (Fig. 4). The conductor 40 is connected to one of the commutator brushes 24 through the associated brush terminal 40ª (Fig. 3) while the other conductor 39 is connected to one or the other of the field windings 14 and 15 through a single-pole double-throw reversing switch 41 (Fig. 4). When the switch 41 is in its mid-position as illustrated, the motor is open circuited and hence deenergized. On the other hand, closure of the switch 41 in one or the other of its two closed positions energizes the corresponding field winding 14 or 15 for rotation of the motor in the corresponding direction. Thus, upon closure of contact 42, the supply line 39, is connected through the switch 41 to the winding 14 and through conductor 43 to the second one of the brushes 24, the connection being made through the corresponding terminal 43ª (Fig. 3). Similarly, closure of the switch contact 43 connects the supply line 39 to the oppositely wound field coil 15, and again through the conductor 43 to the second brush 24. The armature or rotor windings 18 are shown as connected in delta relation (Fig. 4) although a star connection may be utilized if desired. It will thus be seen that the motor may be easily and effectively controlled for rotation in either direction by the single pole switch 41.

In order to prevent inadvertent clutch disengagement when the motor is running at light load or no-load, it is desirable to connect a resistor 44 in series relation with the field windings. The resistor 44 is shown in Fig. 4 as connected in shunt with the armature windings 18 across the brushes 24 so that a single resistor serves for both of the field windings 14 and 15. The resistor 44 is of low resistance as compared to the no-load impedance of the armature being about 3 or 4 ohms for the motor shown. With such an arrangement the current flow through the field winding is always sufficiently large to insure a strong enough pull on the rotor 11 to maintain it in alinement with the stator when the motor is energized.

Although a particular embodiment of the invention has been shown and described herein in some detail for purposes of illustration of its various novel features, there is no intention to thereby limit the invention to such embodiment, but on the other hand, the appended claims are intended to cover all modifications and variations within the spirit and scope of the invention.

I claim as my invention:
1. In an electric motor, the combination of a stator and a rotor, means supporting said rotor for limited axial movement as well as for rotational movement, the magnetic attraction between said stator and rotor serving to pull said rotor axially substantially into alinement with said stator when said motor is in operation, a disk-shaped commutator fast on said rotor and provided with segments of conducting material mounted in insulated relation on the outer end-face thereof, a stationary brush contacting said segments on said commutator, a brush tensioning mechanism resiliently urging said brush against said commutator end-face segments with a force applied generally axially of said rotor for not only maintaining said brush in engagement with said segments but also for yieldably urging said rotor to a position axially offset from said stator, and means for utilizing the axial rotor movement effected by said brush tensioning mechanism upon deenergization of said motor to automatically disconnect the same from an associated load, said last named means including a disengageable clutch operable in response to axial movement of said rotor.

2. In an electric motor, the combination of a stator and a rotor, means supporting said rotor for rotational as well as limited axial movement, the magnetic attraction between said stator and rotor serving to pull said rotor axially into substantial alinement with said stator when said motor is in operation, a commutator fast on said rotor and mounted for bodily movement therewith, a stationary brush contacting said commutator, a brush tensioning mechanism resiliently urging said brush against said commutator with a force applied generally axially with said rotor for not only maintaining said brush in an engagement with said commutator but also for yieldably urging said rotor to a position axially offset from said stator, and means for utilizing the axial rotor movement effected by said brush tensioning mechanism upon deenergization of said motor to automatically disconnect the same from an associated load, said last named means including a disengageable clutch operable in response to axial movement of said rotor.

3. In an electric motor, the combination of a stator and a rotor, means supporting said rotor for limited axial movement as well as for rotational movement, the magnetic attraction between said stator and rotor serving to pull said rotor axially substantially into alinement with said stator when said motor is in operation, a disk-shaped commutator fast on said rotor and provided with segments of conducting material mounted in insulated relation on the outer end-face thereof, a stationary brush contacting said segments on said commutator, and means resiliently urging said brush against said commutator end-face segments with a force applied generally axially of said rotor for not only maintaining said brush in engagement with said segments but also for yieldably urging said rotor to a position axially offset from said stator.

4. In an electric motor, the combination with a stator and an axially movable as well as rotatable rotor having a commutator thereon and a brush contacting said commutator, of a single means for maintaining said brush in contact with the commutator and simultaneously urging said rotor axially out of alinement with said stator.

5. The combination in an electric motor of a stator defining a rotor recess, a rotor, means supporting said rotor for rotational movement as well as for limited axial movement from a first position within said recess to a second position at least partially out of said recess, an energizable winding on said rotor, a commutator for said winding carried by said rotor, means including a resilient cantilever brush contact finger bearing against said commutator and exerting a force generally axially of said rotor for not only establishing an electrical contact with said commutator but also for yieldably urging said rotor to said second position, and a disengageable clutch operatively connected to said rotor and movable into and out of engaged position in response to movement of said rotor respectively into said first and second positions.

6. In an electric motor adapted to actuate the tuning instrumentality of an automobile radio receiver or the like when mounted in any one of a plurality of positions, the combination of a stator having a rotor recess thereon, a fixed shaft extending through said recess, a rotor, a disk-shaped commutator having current conducting segments on the outer end-face thereof, means including a sleeve telescoped on said shaft for supporting said rotor and commutator for endwise movement thereon as well as for rotational movement, means including a resiliently supported brush bearing against said commutator and exerting a force thereon generally axially of said sleeve for yieldably urging said rotor axially out of said recess and fashioned to permit axial movement of said rotor into said recess in response to the magnetic attraction exerted thereon during the operation of said rotor, and means for automatically disconnecting said motor from the associated radio tuning instrumentality or the like immediately upon deenergization of said motor, said last named means including a disengageable clutch operatively connected to said rotor and movable into and out of engaged position in response to movement of said rotor respectively into and out of said rotor recess.

7. In an electric motor, the combination of a stator having a rotor recess therein and presenting generally flat end-faces, a sheet metal end-bell secured to one of said end-faces and having an L-shaped bracket projecting laterally therefrom, a shaft having one end thereof supported in said bracket, a rotor carried by said shaft within said rotor recess, and a pinion carried by said shaft between the outer leg of said bracket and the face of said end-bell with a portion of the periphery of said pinion exposed for engagement with a cooperating gear or the like.

8. An electric motor comprising, in combination, a magnetizable stator core having a rotor recess therein, a rotor mounted in said recess for endwise movement as well as for rotational movement, series connected energizing windings on said stator and rotor, means yieldably urging said rotor axially out of said recess and fashioned to permit movement of said rotor axially into said recess and into substantial alinement therewith in response to the magnetic attraction resulting from the energization of said winding on said magnetizable stator, means for actuating a releasable clutch in response to axial movement of said rotor, and means including a resistor connected in shunt with said rotor winding and in series with said stator winding for insuring a minimum current flow through said stator winding to effect axial movement of said rotor even when the motor is operated at no-load.

9. In an electric motor the combination with a stator and an axially shiftable as well as rotatable rotor having series connected energizing windings thereon, of a comparatively low resistance shunt about said armature winding for insuring a strong field current even when the motor is operated under light loads.

10. In an electric motor the combination with a stator and a rotor having widely spaced salient pole projections thereon provided with respective energizing windings thereon producing wide variations in starting torque depending upon the starting position of the rotor, of a clutch operatively connected to said rotor, means for disengaging said clutch when the motor is idle, and means responsive to energization of the motor for engaging said clutch and thereby permitting said rotor to gain momentum before the load is applied thereto.

11. An electric motor comprising, in combination, a stator, a rotor mounted for axial shifting movement relative to said stator, an end-face commutator mounted in fixed relation to said rotor to shift therewith, and resilient brush means engaging the end face of said commutator and serving to shift said rotor and commutator axially when the motor is deenergized.

12. An electric motor comprising, in combination, a stator, a rotor, means including a sleeve telescoped on a shaft supporting said rotor for axial shifting movement relative to said stator, an end-face commutator fast on said sleeve to shift with said rotor, and resilient brush means engaging the end face of said commutator and serving to shift said rotor and commutator axially when the motor is deenergized.

EDWARD L. BARRETT.